US012518912B2

(12) United States Patent
Higashida et al.

(10) Patent No.: US 12,518,912 B2
(45) Date of Patent: Jan. 6, 2026

(54) COIL DEVICE

(71) Applicant: TDK CORPORATION, Tokyo (JP)

(72) Inventors: Keigo Higashida, Tokyo (JP); Toru Tonogai, Tokyo (JP)

(73) Assignee: TDK CORPORATION, Tokyo (JP)

( * ) Notice: Subject to any disclaimer, the term of this patent is extended or adjusted under 35 U.S.C. 154(b) by 723 days.

(21) Appl. No.: 17/882,941

(22) Filed: Aug. 8, 2022

(65) Prior Publication Data

US 2023/0075338 A1 Mar. 9, 2023

(30) Foreign Application Priority Data

Aug. 18, 2021 (JP) ................................ 2021-133630

(51) Int. Cl.
*H01F 27/29* (2006.01)
*H01F 17/04* (2006.01)
*H01F 27/36* (2006.01)

(52) U.S. Cl.
CPC ......... *H01F 27/292* (2013.01); *H01F 17/045* (2013.01); *H01F 27/363* (2020.08); *H01F 2017/048* (2013.01)

(58) Field of Classification Search
CPC .... H01F 27/292; H01F 27/363; H01F 17/045; H01F 2017/048
See application file for complete search history.

(56) References Cited

U.S. PATENT DOCUMENTS

| | | | | |
|---|---|---|---|---|
| 11,437,183 B2 * | 9/2022 | Oh | H01F 27/36 |
| 2003/0048167 A1 * | 3/2003 | Inoue | H01F 41/046 336/200 |
| 2016/0083626 A1 * | 3/2016 | Ebe | C09J 163/00 428/323 |
| 2016/0240296 A1 * | 8/2016 | Kim | H01F 17/04 |
| 2017/0200682 A1 * | 7/2017 | Lin | H01L 24/97 |
| 2017/0271062 A1 * | 9/2017 | Furukawa | H05K 9/0075 |
| 2017/0309394 A1 | 10/2017 | Blow et al. | |
| 2018/0096783 A1 * | 4/2018 | Fukuda | H01F 27/366 |
| 2018/0166211 A1 * | 6/2018 | Takatsuji | H02M 3/156 |
| 2019/0379343 A1 * | 12/2019 | Miyahara | H01G 4/224 |
| 2020/0082975 A1 * | 3/2020 | Yang | H01F 17/0013 |
| 2020/0090850 A1 * | 3/2020 | Isobe | H01F 27/292 |
| 2020/0111594 A1 | 4/2020 | Blow et al. | |

FOREIGN PATENT DOCUMENTS

| | | |
|---|---|---|
| JP | H04-267512 A | 9/1992 |
| JP | H05-59801 U | 8/1993 |
| JP | 2017-005114 A | 1/2017 |
| JP | 2019-516246 A | 6/2019 |
| JP | 2020-009866 A | 1/2020 |
| JP | 2020-170865 A | 10/2020 |
| WO | 2018/159481 A1 | 9/2018 |

* cited by examiner

*Primary Examiner* — Malcolm Barnes
(74) *Attorney, Agent, or Firm* — Oliff PLC

(57) ABSTRACT

A coil device 2 comprises an element body 4 including a magnetic body, a coil 6α incorporated in the element body 4, and a terminal electrode 8 connected to a lead portion of the coil 6α. A shielding layer 10 including a metal and a resin is formed on at least one outer surface **4*a* of the element body 4**.

17 Claims, 12 Drawing Sheets

COIL DEVICE

TECHNICAL FIELD

The present disclosure relates to a coil device used as, for example, an inductor.

BACKGROUND

Coil devices, such as inductors, are widely used in electronic equipment. To reduce leakage of magnetic flux produced by a current flowing in such coil devices outwards from products, a coil device according to Patent Literature 1 includes a copper shielding sheet formed separately from an element body of the coil device and has the sheet attached to the element body.

Unfortunately, attaching the separately-formed shielding sheet to the element body in this manner increases the size and manufacturing costs of the coil device.

Patent Literature 1: JP Patent Application Laid Open (Translation of PCT Application) No. 2019-516246.

SUMMARY

The present disclosure has been achieved under such circumstances. It is an object of the disclosure to provide a coil device capable of effectively reducing leakage flux particularly at a high frequency and having reduced size and manufacturing costs.

The present inventors have explored a way to achieve a coil device capable of effectively reducing leakage flux and having reduced size and manufacturing costs. Through diligent exploration, the present inventors have found that forming a specific shielding layer on a surface of an element body of the coil device can effectively reduce leakage flux from the coil device particularly at a high frequency even if the shielding layer is thin, and have achieved the present invention.

A coil device according to the present disclosure includes an element body including a magnetic body;

a coil incorporated in the element body; and a terminal electrode connected to a lead portion of the coil; wherein a shielding layer including a metal and a resin is formed on at least one outer surface of the element body.

The shielding layer can be formed by only applying a raw material paste including the metal and the resin, drying the paste, and hardening the paste. The thickness of the shielding layer can be readily controlled. Thus, the coil device can be readily manufactured, can have improved adhesion between the shielding layer and the element body, and can be reduced in size, compared to a coil device including an element body to which a metal shielding sheet is attached.

Specifically, the shielding layer may include a metal-rich area where the metal is observed to a greater extent than the resin. Specifically, the metal may occupy 50% or more of a cross section of the metal-rich area. More specifically, the metal may occupy 80% or more of the cross section of the metal-rich area. It is assumed that the metal-rich area enhances effects of preventing leakage flux.

Specifically, the shielding layer may include a resin-rich area where the resin is observed to a greater extent than the metal, and the resin-rich area may be disposed at an interface between the element body and the metal-rich area. It is assumed that the resin-rich area enhances the adhesion between the shielding layer and the element body.

The terminal electrode may include an area including a material identical to that of the metal-rich area of the shielding layer. With this structure, leakage flux at a certain noise frequency can be reduced effectively. It is assumed that this is because the metal-rich area made of the same material can cover the surface of the element body more widely. Using the same raw material also enables the terminal electrode and the shielding layer to be formed simultaneously, thus reducing manufacturing costs.

Specifically, the shielding layer may include a coating layer made of a paste applied to the at least one outer surface of the element body, and the paste includes the metal and the resin. The coating layer can be readily formed, and the thickness of the coating layer can also be readily controlled. Thus, configuration changes of the coil device can be made more easily than configuration changes of the coil device including the metal shielding sheet. This can reduce manufacturing costs.

Specifically, the shielding layer may include Ag. It is confirmed that the shielding layer including Ag can effectively reduce leakage flux particularly at a high frequency even if the shielding layer is thin.

Specifically, the paste may include a flat-shaped metal powder. The paste may include a substantially spherical metal powder. Specifically, the coating layer may be formed by heating the applied paste at a temperature ranging from 170° C. to 230° C.

According to the shielding layer formed from such a paste, effects of reducing leakage flux are enhanced. Specifically, the paste may include a small metal powder with an average particle size of preferably 800 nm or less and more preferably 100 to 500 nm. With such a metal powder included, the metal-rich area can have an increased proportion of the metal when the coating layer is heated at a temperature at which the resin included in the paste hardens (170° C. to 230° C.). It is assumed that, because the metal powder includes fine particles, a phenomenon close to metal sintering occurs at a temperature lower than the melting point of the metal itself.

Specifically, the shielding layer may be formed on the at least one outer surface opposite an outer surface of the element body where the terminal electrode is formed. The coil device with the shielding layer formed on the opposite-mounting-side surface in this manner can have effectively reduced leakage flux from the opposite-mounting-side. A plating layer may be formed on a surface of the shielding layer. This plating layer and a plating layer on a surface of the terminal electrode of the coil device can be formed simultaneously.

The shielding layer may include an opposite-mounting-side shielding layer formed on the opposite-mounting-side surface of the element body, and a ground conducting portion extending from the opposite-mounting-side shielding layer almost to the mounting-side surface of the element body across a side surface of the element body.

With this structure, the shielding layer can be connected to the ground. Thus, the shielding layer can have the same electric potential as the electric potential of the ground. Consequently, the effects of preventing leakage flux that are produced by the shielding layer can be enhanced. The ground conducting portion can also function as a shield against leakage flux at the side surface of the element body. Further, connecting the ground conducting portion to the ground increases connecting locations of the coil device other than the terminal electrode, thus improving the mounting strength of the coil device.

A recess recessed toward the opposite-mounting-side of the element body may be formed on the mounting-side surface of the element body, and a mounting-side shielding layer may be formed at the recess. With this structure, an electronic component (e.g., a capacitor chip) can be disposed in the space formed by the recess above a circuit board. The mounting-side shielding layer, which is formed at the recess, can also reduce leakage flux, thus preventing negative influence on the electronic component.

The shielding layer may extend to cover outer surfaces other than the mounting-side surface of the element body. With this structure, leakage flux can be further reduced.

The terminal electrode may extend in an L shape from the mounting-side surface of the element body to a side surface of the element body. With this structure, a solder fillet is readily formed when the coil device is mounted on, for example, the circuit board.

BRIEF DESCRIPTION OF THE DRAWING(S)

DETAILED DESCRIPTION

Hereinafter, the present disclosure is explained based on the embodiments shown in the figures.

First Embodiment

Figure 1A:
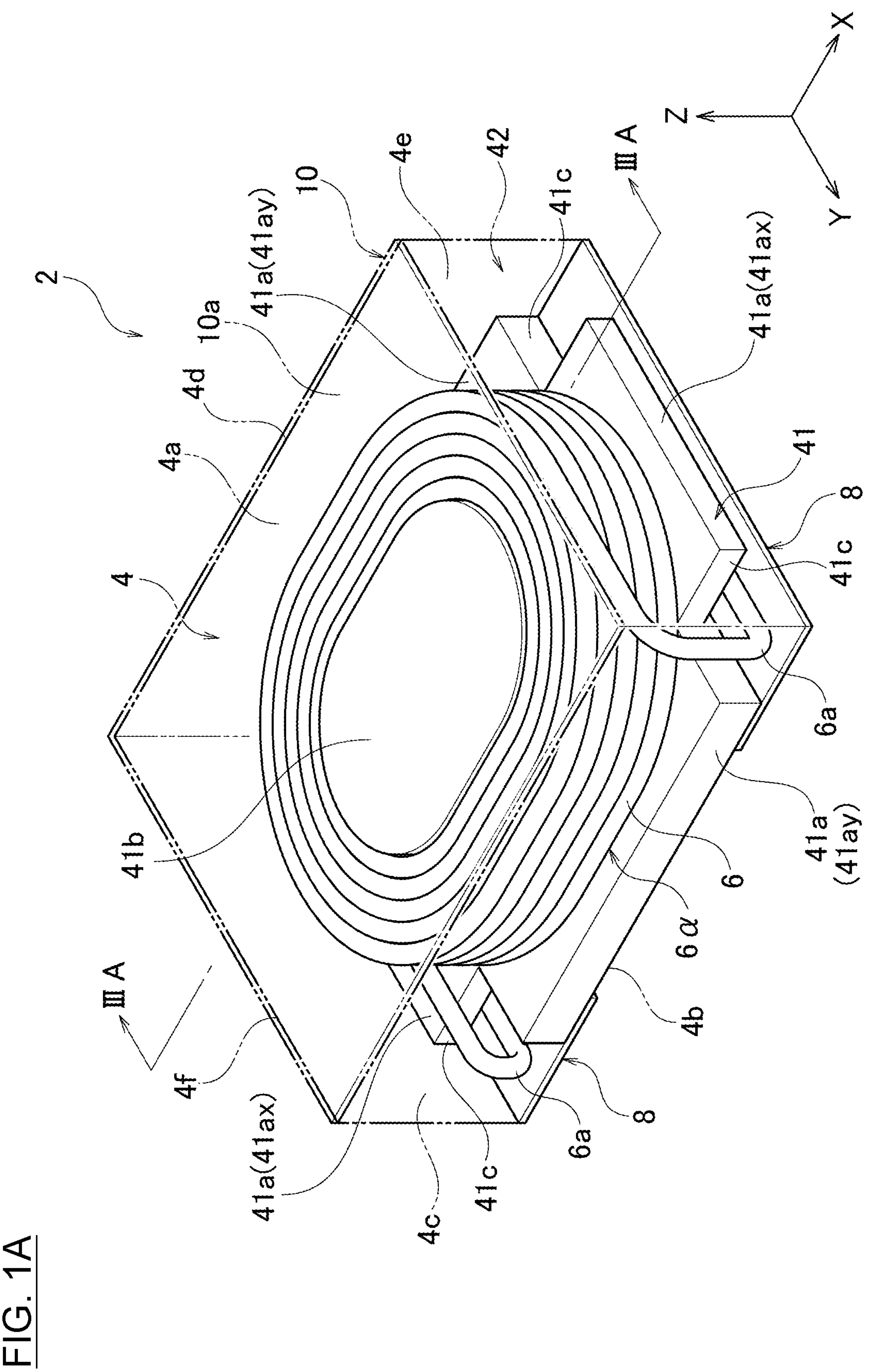
FIG. 1A is a perspective view of a coil device according to an embodiment of the present disclosure.

As shown in FIG. 1A, an inductor 2 as a coil device according to a first embodiment of the present disclosure includes an element body 4 containing a substantially rectangular parallelepiped shape (substantially hexahedron shape).

The element body 4 includes an upper surface 4*a*, a bottom surface 4*b* opposite the upper surface 4*a* in the Z-axis direction, and four side surfaces 4*c* to 4*f* Dimensions of the element body 4 are not limited. For example, the element body 4 may have a dimension of 1.2 to 6.5 mm in the X-axis direction, a dimension of 0.6 to 6.5 mm in the Y-axis direction, and a dimension of 0.5 to 5.0 mm in the height (Z-axis) direction.

Figure 2A:
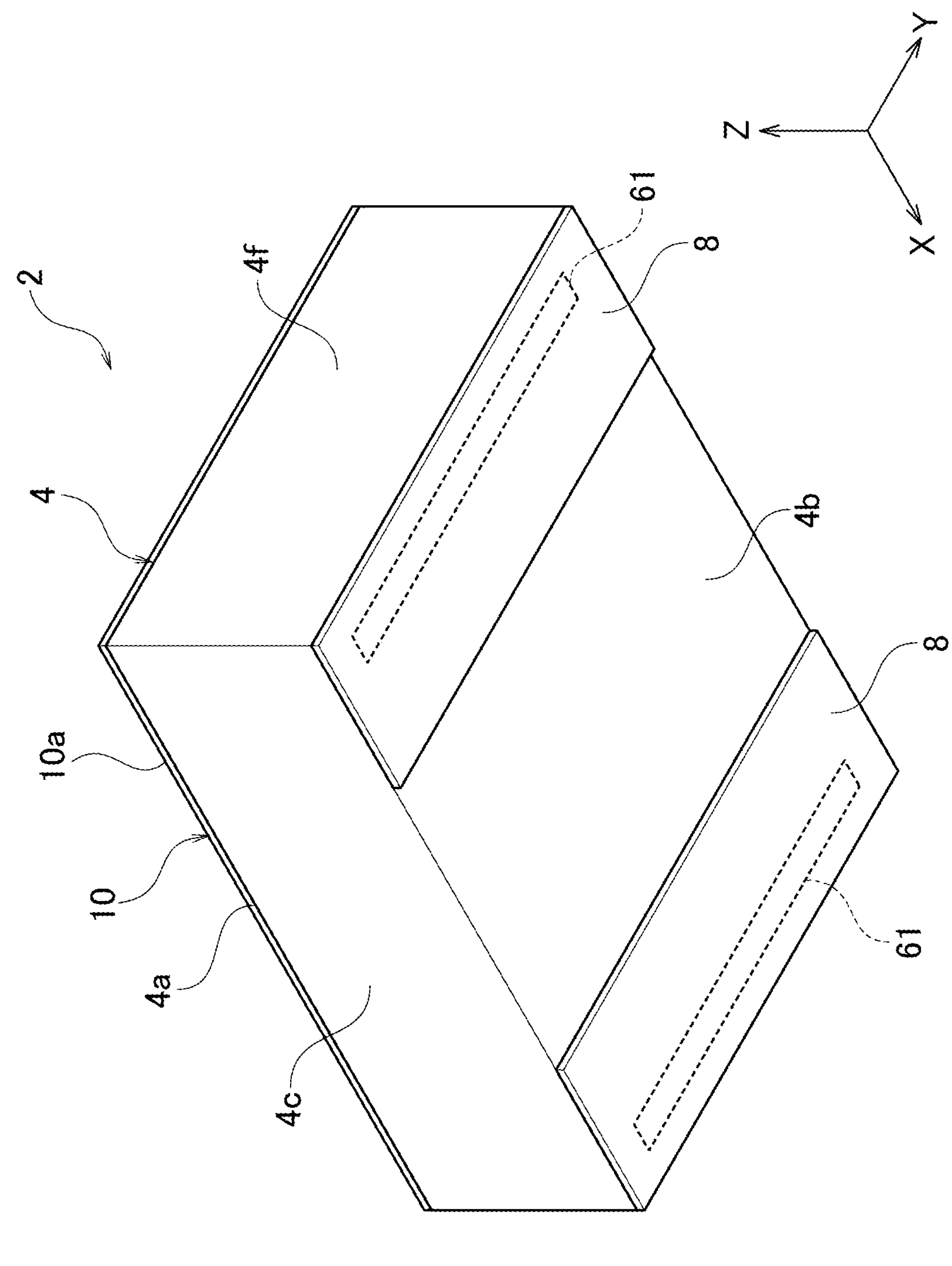
FIG. 2A is a perspective view of the coil device shown in FIG. 1A from a different angle.
Figure 3A:
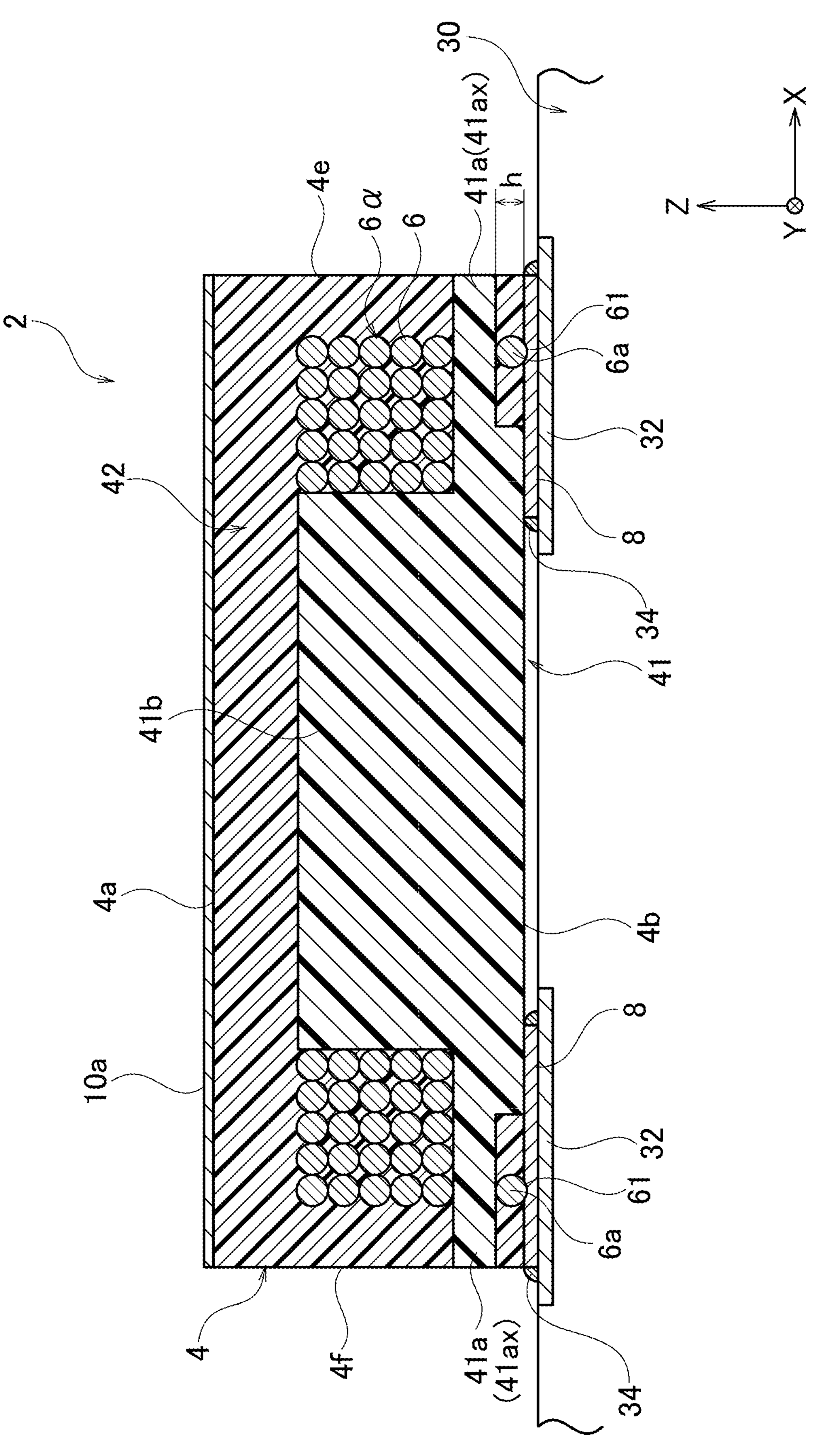
FIG. 3A is a cross-sectional view taken along line IIIA-IIIA when the coil device shown in FIG. 1A is mounted on a circuit board.

As shown in FIGS. 1A, 2A, and 3A, a pair of terminal electrodes 8 is formed on the bottom surface 4*b* of the element body 4. The pair of terminal electrodes 8 is spaced apart from each other in the X-axis direction and is insulated from each other. The inductor 2 of the present embodiment can be connected to an external circuit by connecting the terminal electrodes 8 to lands 32 or the like formed on a circuit board 30 shown in FIG. 3A.

The inductor 2 can be mounted on various circuit boards (e.g., the circuit board 30) using a joining member (e.g., a solder 34 and a conductive adhesive). When the inductor 2 is to be mounted on the circuit board 30, the bottom surface 4*b* of the element body 4 is to be a mounting surface, and the terminal electrodes 8 and the circuit board 30 are to be joined via the joining member (e.g., the solder 34).

The element body 4 includes a coil 6α inside. The coil 6α includes a wire 6 wound in a coil shape as a conductor. In FIG. 1A of the present embodiment, the wire 6 of the coil 6α is wound crosswise. However, the wire 6 may be wound normally. The wire 6 may alternatively be wound directly around a winding core 41*b*.

The wire 6, which constitutes the coil 6α, includes a conductor portion mainly containing copper, and an insulating layer covering the outer periphery of the conductor portion. More specifically, the conductor portion includes pure copper (e.g., oxygen-free copper and tough pitch copper), an alloy containing copper (e.g., phosphor bronze, brass, red brass, beryllium copper, and a silver-copper alloy), a copper-coated steel wire, or the like. On the other hand, the insulating layer is not limited to particular types as long as the insulating layer has electrical insulating properties. Examples of the insulating layer include an epoxy resin, an acrylic resin, polyurethane, polyimide, polyamide-imide, polyester, nylon, or a synthetic resin in which at least two of the above resins are mixed. Additionally, as shown in FIGS. 1A and 3A, the wire 6 in the present embodiment is a round wire, and a cross section of the conductor portion has a circular shape.

As shown in FIGS. 1A and 3A, the element body 4 in the present embodiment includes a first core 41 and a second core 42. The first core 41 and the second core 42 may each include a dust core containing a magnetic material and a resin.

The magnetic material contained in each of the cores 41 and 42 may include, for example, a ferrite powder or a metal magnetic powder. Examples of the ferrite powder include a Ni—Zn-based ferrite and a Mn—Zn-based ferrite. The metal magnetic powder is not limited to particular types. Examples of the metal magnetic powder include an Fe—Ni alloy, an Fe—Si alloy, an Fe—Co alloy, an Fe—Si—Cr alloy, an Fe—Si—Al alloy, an amorphous alloy containing Fe, a nano-crystalline alloy containing Fe, and other soft magnetic alloys.

Subcomponents may be appropriately added to the ferrite powder or the metal magnetic powder. The first core 41 and the second core 42 may include, for example, the same magnetic material, and relative permeability μ1 of the first core 41 and relative permeability μ2 of the second core 42 may be equalized. The first core 41 and the second core 42 may alternatively include different magnetic materials.

The magnetic material (i.e., the ferrite powder or the metal magnetic powder), which is included in the first core 41 or the second core 42, may have a median diameter (D50) of 5 to 50 μm. The magnetic material may further include a mixture of particle groups with different D50. For example, a large-size powder with a D50 of 8 to 30 μm, a medium-size powder with a D50 of 1 to 5 μm, and a small-size powder with a D50 of 0.3 to 0.9 μm may be mixed.

When the particle groups are mixed as described above, the ratio between the large-size powder, the medium-size powder, and the small-size powder is not limited to particular ratios. Also, the large-size powder, the medium-size powder, and the small-size powder may include the same material or may include different materials. Including the particle groups in the magnetic material of the first core 41 or the second core 42 as described above can increase the packing rate of the magnetic material included in the element body 4. Consequently, various properties of the inductor 2 improve, such as permeability, eddy current loss, and DC bias characteristics.

The particle size of the magnetic material can be measured by observing a cross section of the element body 4 with a scanning electron microscope (SEM), a scanning transmission electron microscope (STEM), or the like and performing image analysis of a given cross-sectional photograph with software. In the measurement, the particle size of the magnetic material may specifically be measured in terms of an equivalent circular diameter.

When the first core 41 or the second core 42 includes the metal magnetic powder, particles constituting the powder are preferably insulated from each other. Examples of the insulating method include a method of forming an insulating film on a particle surface. Examples of the insulating film include a film formed from a resin or an inorganic material, and an oxidized film formed by oxidizing the particle surface in a heat treatment. When the insulating film is formed from a resin or an inorganic material, the resin may be a silicone resin, an epoxy resin, or the like, and the inorganic material may be a phosphate (e.g., magnesium phosphate, calcium phosphate, zinc phosphate, and manganese phosphate), silicate (e.g., sodium silicate (water glass)), soda lime glass, borosilicate glass, lead glass, aluminosilicate glass, borate glass, or sulfate glass. Forming the insulating film can improve insulation properties among the particles and the withstand voltage of the inductor 2.

The resin included in the first core 41 or the second core 42 is not limited to particular resins. The resin may be, for example, a thermosetting resin (e.g., an epoxy resin, a phenol resin, a melamine resin, a urea resin, a furan resin, an alkyd resin, a polyester resin, and a diallyl phthalate resin) or a thermoplastic resin (e.g., an acrylic resin, polyphenylene sulfide (PPS), polypropylene (PP), and a liquid crystal polymer (LCP)).

As shown in FIG. 1A, the first core 41 includes flange portions 41*a*, the winding core 41*b*, and notched portions 41*c*. The flange portions 41*a* protrude toward the side surfaces 4*c* to 4*f* of the element body 4. The number of the flange portions 41*a*, which correspond one-to-one to the side surfaces 4*c* to 4*f*, is four. The coil 6α is installed on the upper surfaces of the flange portions 41*a*, and the flange portions 41*a* support the coil 6α. First flange portions 41*ax* denote the two flange portions 41*a* protruding along the X-axis direction, and second flange portions 41*ay* denote the two flange portions 41*a* protruding along the Y-axis direction. The thickness of the first flange portions 41*ax* is smaller than the thickness of the second flange portions 41*ay*. Under each first flange portion 41*ax* is a space for accommodating a part of a lead portion 6*a*.

The winding core 41*b* is located above the flange portions 41*a* in the Z-axis direction and is formed integrally with the flange portions 41*a*. The winding core 41*b* has a substantially elliptical columnar shape protruding upwards in the Z-axis direction and is inserted inside the coil 6α. The shape of the winding core 41*b* is not limited to the shape shown in FIGS. 1A and 3A. The winding core 41*b* may have a shape that matches the winding shape of the coil 6α. For example, the winding core 41*b* may have a circular columnar shape or a prism shape.

The notched portions 41*c* are formed at four corners of the X-Y plane, where one of the flange portions 41*a* meet one of the other flange portions 41*a*. The number of the notched portions 41*c* is four. That is, each notched portion 41*c* is formed in the vicinity of where one of the side surfaces 4*c* to 4*f* meets one of the other side surfaces 4*c* to 4*f* of the element body 4. Each notched portion 41*c* is used as a passage through which the lead portion 6*a* drawn from the coil 6α passes. Each notched portion 41*c* also functions as a passage through which a molding material constituting the second core 42 flows from the front side to the back side of the first core 41 in a manufacturing process. In FIG. 1A, the notched portions 41*c* are cut out in a substantially square shape. However, the shape of the notched portions 41*c* is not limited to this shape as long as the lead portion 6*a* and the molding material may pass therethrough. For example, the notched portions 41*c* may be through-holes that penetrate the flange portions 41*a* from their upper surfaces to their lower surfaces.

As shown in FIG. 3A, the second core 42 covers the first core 41. More specifically, the second core 42 covers the coil 6α and the winding core 41*b* above the flange portions 41*a*, and fills the spaces at the notched portions 41*c* and under the first flange portions 41*ax*. Note that, as shown in FIG. 1A, the lower surfaces of the second flange portions 41*ay* constitute a part of the bottom surface 4*b* of the element body 4, and the second core 42 is not present under the second flange portions 41*ay*.

As shown in FIG. 1A, a pair of the lead portions 6*a* is drawn from the coil 6α along the Y-axis above the first flange portions 41*ax*. Further, the pair of lead portions 6*a* is folded back in the vicinity of the side surface 4*c* of the element body 4 and extends from near the side surface 4*c* to near the side surface 4*d* under the first flange portions 41*ax*.

The height "h" (shown in FIG. 3A) from the bottom surface 4*b* of the element body 4 to the first flange portions 41*ax* in the Z-axis direction is shorter than the outer diameter of the lead portions 6*a*. Accordingly, the lead portions 6*a* are mostly accommodated inside the element body 4 (particularly, the second core 42), but a part of the outer periphery of the lead portions 6*a* is exposed to the bottom surface 4*b* of the element body 4, under the first flange portions 41*ax*. Each of the lead portions 6*a*, which are constituted by the wire 6, has the insulating layer on the outer periphery of the wire 6 removed at the part exposed to the bottom surface 4*b*, and the conductor portion of the wire 6 is exposed at that part. In the present embodiment, as shown in FIG. 2A, the part of the conductor portion of the wire 6 exposed to the bottom surface 4*b* is defined as a leadout electrode portion 61.

In the present embodiment, as shown in FIG. 2A, the pair of terminal electrodes 8 is formed so as to cover a pair of the leadout electrode portions 61, and each of the leadout electrode portions 61 is electrically connected to the corresponding one of the terminal electrodes 8.

Each terminal electrode 8 may include a resin electrode layer. Additionally, the terminal electrode 8 may have a stacked structure including the resin electrode layer and another electrode layer. When the terminal electrode 8 has the stacked structure, the resin electrode layer is formed so as to be in direct contact with the leadout electrode portion 61, and the other electrode layer is stacked on the outer surface of the resin electrode layer (i.e., opposite the leadout electrode portion 61).

The other electrode layer may include a single layer or a plurality of layers, and the material thereof is not limited to particular types. For example, the other electrode layer may include a metal such as Sn, Au, Ni, Pt, Ag, and Pd, or an alloy containing at least one of these metal elements, and may be formed by plating or sputtering. The terminal electrode 8 may specifically have an entire average thickness of 10 to 60 μm. The resin electrode layer of the terminal electrode 8 may specifically have an average thickness of 10 to 50 μm.

As shown in FIG. 1A, a shielding layer 10 is formed on the upper surface 4*a* of the element body 4 in the present embodiment. The shielding layer 10 includes an opposite-mounting-side shielding layer 10*a* formed on the entire upper surface 4*a* of the element body 4. The opposite-mounting-side shielding layer 10*a* is formed so as to cover at least the coil 6α in plan view from the Z-axis direction. Although the opposite-mounting-side shielding layer 10*a* may not necessarily be formed on the entire upper surface 4*a*, the opposite-mounting-side shielding layer 10*a* may preferably cover the upper surface 4*a* widely.

Figure 4A:
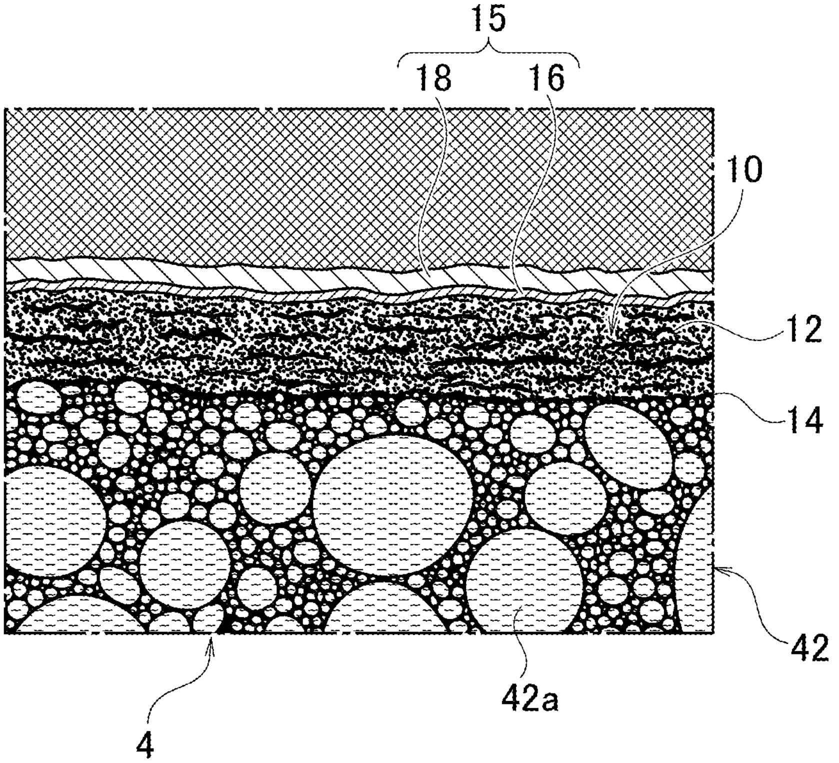
FIG. 4A is a schematic diagram of an enlarged cross-sectional photograph of a coil device according to an example.
Figure 4B:
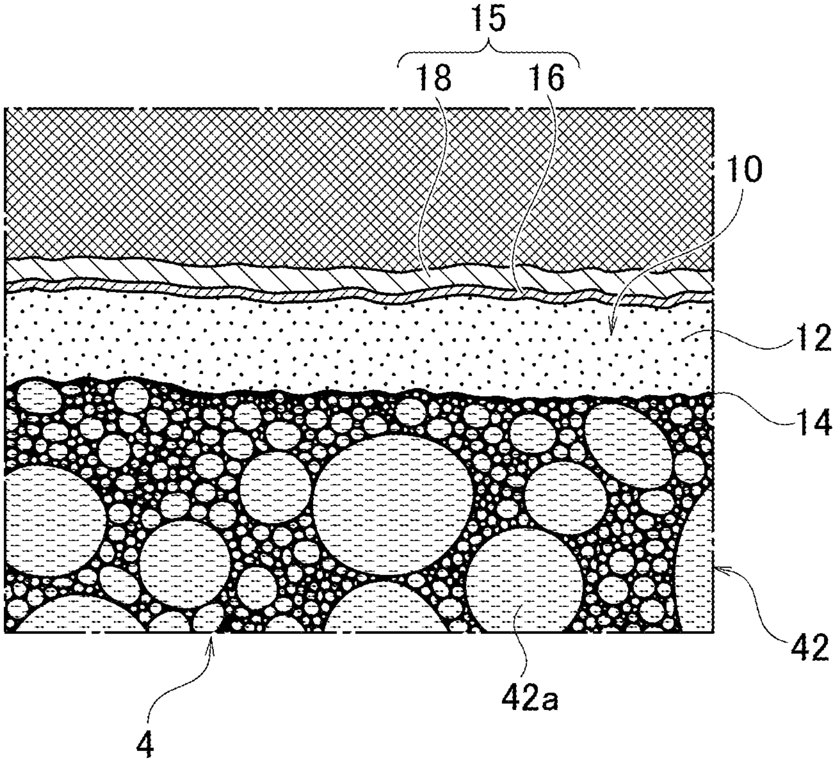
FIG. 4B is a schematic diagram of an enlarged cross-sectional photograph of a coil device according to another example.

As shown in FIGS. 4A and 4B, each of which is a schematic diagram of a cross-sectional photograph of the shielding layer 10 including the opposite-mounting-side shielding layer 10*a*, the shielding layer 10 includes a metal-rich area, namely a metal-rich layer 12, and a resin-rich area, namely a resin-rich layer 14. A plating layer 15 may be formed on a surface of the metal-rich layer 12.

The plating layer 15 may include, for example, an intermediate layer 16 and an outermost layer 18. The plating layer 15 and a plating layer on the surface of the terminal electrode 8 may be formed simultaneously. The outermost layer 18 of the plating layer 15 may specifically include, for example, tin or a tin alloy with good solder wettability. The intermediate layer 16 includes, for example, nickel or a nickel alloy, and may include a single layer or a plurality of stacked layers.

In the present embodiment, the resin-rich layer 14 is observed at an interface between a surface of the second core 42 of the element body 4 and the metal-rich layer 12. Each of FIGS. 4A and 4B is a schematic diagram of a cross-sectional photograph of a coil device by SEM. In the cross-sectional photograph by SEM, a resin component and a void are shown in black, a metal component is shown in white, and magnetic particles are shown in gray. In FIGS. 4A and 4B, each of which is the schematic diagram of the cross-sectional photograph, a cross section of the metal shown in white by SEM is represented by a hatched area or in white, a cross section of the magnetic particles of the second core shown in gray by SEM is represented with a dashed line, and a cross section of the resin of the element body 4 shown in black by SEM is represented in black. The void, which is shown in black by SEM, outside the shielding layer is represented in a diagonal lattice pattern. While a black portion inside the element body 4 and the shielding layer 10 partly includes a void in addition to the resin component, it is confirmed in a test (e.g., an adhesion test) that a black portion in the resin-rich layer 14 does not include a void but includes the resin component.

The metal-rich layer 12 can be defined as a layer that is on the surface of the element body 4 including magnetic particles 42*a* and has a region with a larger area proportion of the white portion representing the metal component than the black portion representing the resin, excluding the plating layer 15. The resin-rich layer 14 can be defined as a layer having a layered region with a larger area proportion of the black portion representing the resin than the white portion representing the metal component at the interface between the metal-rich layer 12 and the surface of the element body 4.

The proportion of the metal in the metal-rich layer 12 may be preferably 50% or more, more preferably 80% or more, and most preferably 90% or more, in terms of the proportion of the metal area in the cross section. The proportion of the metal in the resin-rich layer 14 may be preferably 50% or less, more preferably 20% or less, and most preferably 3% or less, in terms of the proportion of the metal area in the cross section.

The area occupied by each component can be measured by observing the cross section by SEM or STEM and performing image analysis of a given cross-sectional image. When the SEM is used, the observation may be performed with a backscattered electron image. When the STEM is used, the observation may be performed with an HAADF image. In these images, a portion with dark contrast (close to black) represents the resin component and a portion with bright contrast (close to white) represents the metal component.

Although the resin-rich layer 14 has a slightly uneven thickness at the interface between the metal-rich layer 12 and the surface of the element body 4, it is preferable that the resin-rich layer 14 is formed continuously. However, the resin-rich layer 14 may have a discontinuous portion along the longitudinal direction.

The discontinuous portion can be defined as a portion having a distance of 0.1 μm or less between the metal component (particles or lumps in white) in the metal-rich layer 12 and the magnetic particles (in gray) with a particle size of 1 μm or more inside the element body 4. Regardless of whether shown in white or in gray, independent particles having a particle size of 0.1 μm or less can be included in the definition of the resin-rich layer 14.

The resin-rich layer 14 may have a thickness of preferably 0.5 to 5 μm and more preferably 1 to 3 μm. The metal-rich layer 12 has a thickness of preferably 1 to 50 μm and more preferably 3 to 15 μm.

The metal component in the metal-rich layer 12 may specifically include Ag and may also include Cu, Ni, Sn, Au, Pd, or the like. The resin component in the resin-rich layer 14 may specifically include, for example, a thermosetting resin, such as an epoxy resin and a phenol resin.

Next, a method of manufacturing the inductor 2 of the present embodiment is explained.

First, the first core 41 is prepared using a pressing method (e.g., heating and pressing molding method) or an injection molding method. In preparing the first core 41, a raw material powder of the magnetic material, a binder, a solvent, and the like are kneaded to give granules, which are used as a molding raw material. When the magnetic material includes multiple particle groups, magnetic powders with different particle size distributions are prepared and mixed at a predetermined ratio.

Next, the coil 6α is installed on the first core 41. The coil 6α may be an air core coil having the wire 6 wound in a predetermined shape in advance, and the winding core 41*b* of the first core 41 is inserted in the air core coil. Alternatively, the coil 6α may be formed by directly winding the wire 6 around the winding core 41*b* of the first core 41. After the first core 41 and the coil 6α are joined, the pair of lead portions 6*a* is drawn from the coil 6α and is disposed under the first flange portions 41*ax* as shown in FIG. 1A.

Next, the second core 42 is prepared by insert injection molding. During preparation of the second core 42, the first core 41 on which the coil 6α is installed is firstly put inside a mold.

As a raw material of the second core 42, a material having fluidity at the time of molding is used. Specifically, a composite material given by kneading a raw material powder of the magnetic material and a binder (e.g., a thermoplastic resin or a thermosetting resin) is used. The composite material may also include a solvent, a dispersant, or the like as appropriate. The composite material is turned into a slurry and introduced into the mold in the insert injection molding. At this time, the introduced slurry passes through the notched portions 41*c* of the first core 41 and fills the spaces under the first flange portions 41*ax*. During the injection molding, heat is appropriately applied in accordance with the type of the binder used. In this manner, the element body 4 having the first core 41, the second core 42, and the coil 6α integrated is given.

Next, portions of the bottom surface 4*b* of the element body 4 (i.e., areas where the pair of terminal electrodes 8 is formed in FIG. 3A) are irradiated with a laser to form intended electrode areas. With the laser irradiation, the insulating layer at the part of each lead portion 6*a* exposed to the bottom surface 4*b* is removed, thus forming each leadout electrode portion 61. Moreover, with the laser irradiation, the resin included in the core 42 (the same applies to the core 41) is removed from the outermost surface of the bottom surface 4*b*. This exposes the magnetic material included in the core 42 (the same applies to the core 41) and the leadout electrode portions 61 in the intended electrode areas. This makes the terminal electrodes 8 readily adhere to the bottom surface 4*b* of the element body 4.

Next, using a method such as a printing method, a resin electrode paste is applied to the intended electrode areas. The resin electrode paste used here includes a binder to be the resin component and a metal raw material powder to be the conductor powder. More specifically, the metal raw material powder may preferably include microparticles having a particle size of a micrometer order and nanoparticles having a particle size of a nanometer order.

At the same time, using the same paste as the resin electrode paste for forming the terminal electrodes 8, a coating layer for forming the shielding layer 10 shown in FIG. 1A is formed on the upper surface of the element body 4. The coating layer may have a thickness approximately equivalent to the thickness of the resin electrode layer of each terminal electrode 8. However, the thickness of the coating layer may preferably be determined so that the metal-rich layer 12 shown in FIG. 4A or FIG. 4B has the above-mentioned preferable thickness after heating. To adjust the thickness of the coating layer, application of the paste may be repeated for a number of times, or application and drying of the paste may be repeated.

After the resin electrode paste is applied to the intended electrode areas where the terminal electrodes 8 are to be formed and an intended shielding area where the shielding layer 10 is to be formed, the element body 4 is heated under predetermined conditions to harden the binder (the resin component) in the paste. As for the heating conditions, for example, the treatment temperature (holding temperature) may be specifically 170° C. to 230° C., and the holding time may be specifically 60 to 90 minutes.

After the resin electrode layer to be each terminal electrode 8 is formed, a plating layer or a sputtering layer may be appropriately formed on the outer surface of the resin electrode layer. For example, forming a Ni, Cu, or Sn plating layer on the outer surface of the resin electrode layer improves solder wettability. While the plating layer is formed, the plating layer 15 is also formed on the surface of the shielding layer 10 simultaneously as shown in FIGS. 4A and 4B.

The above manufacturing method gives the inductor 2 having the pair of terminal electrodes 8 on the bottom surface (mounting-side surface) 4*b* of the element body 4 and the shielding layer 10 on the upper surface (opposite-mounting-side surface) 4*a* of the element body 4.

Summary of the First Embodiment

In the present embodiment, the shielding layer 10 including the metal and the resin is formed on the upper surface 4*a* (at least one outer surface) of the element body 4. The shielding layer 10 can be formed by only applying the raw material paste including the metal and the resin, drying the paste, and hardening the paste. The thickness of the shielding layer 10 can be readily controlled. Thus, the coil device 2 can be readily manufactured, can have improved adhesion between the shielding layer 10 and the element body 4, and can be reduced in size, compared to a coil device including an element body to which a metal shielding sheet is attached.

As shown in FIGS. 4A and 4B, the shielding layer 10 includes the metal-rich layer 12, where the metal is observed to a greater extent than the resin. The metal occupies 50% or more of the cross section of the metal-rich layer 12 shown in FIG. 4A. Further, the metal occupies 80% or more of the cross section of the metal-rich layer 12 shown in FIG. 4B. It is assumed that the metal-rich layer 12 enhances effects of preventing leakage flux.

The shielding layer 10 further includes the resin-rich layer 14, which is located at the interface between the element body 4 and the metal-rich layer 12. It is assumed that the resin-rich layer 14 enhances the adhesion between the shielding layer 10 and the element body 4.

Each of the terminal electrodes 8 includes the resin electrode layer made of the same material as the metal-rich layer 12 of the shielding layer 10. With this structure, leakage flux at a certain noise frequency can be reduced effectively. It is assumed that this is because the metal-rich layer 12 made of the same material can cover the surface of the element body 4 more widely. Using the same raw material also enables the terminal electrodes 8 and the shielding layer 10 to be formed simultaneously, thus reducing manufacturing costs.

The shielding layer 10 includes the coating layer made of the paste, which includes the metal and the resin, applied to the outer surface of the element body. The coating layer can be readily formed, and the thickness of the coating layer can also be readily controlled. Thus, configuration changes of the coil device 2 can be made more easily than configuration changes of the coil device including the metal shielding sheet. This can reduce manufacturing costs.

In the present embodiment, the shielding layer may include Ag. It is confirmed that the shielding layer including Ag can effectively reduce leakage flux particularly at a high frequency even if the shielding layer is thin.

In the present embodiment, the paste may include a flat-shaped metal powder. The paste may include a substantially spherical metal powder. The coating layer may specifically be formed by heating the applied paste at a temperature ranging from 170° C. to 230° C.

According to the shielding layer formed from such a paste, effects of reducing leakage flux are enhanced. Specifically, the paste may include a small metal powder with an average particle size of preferably less than 800 nm and more preferably 100 to 500 nm. With such a metal powder included, the metal-rich layer can have an increased proportion of the metal when the coating layer is heated at a temperature at which the resin included in the paste hardens (170° C. to 230° C.). It is assumed that, because the metal powder includes nanoparticles, a phenomenon close to metal sintering occurs at a temperature lower than the melting point of the metal itself.

In the present embodiment, the shielding layer 10 is formed on the upper surface 4*a*, which is opposite the bottom surface 4*b* of the element body 4 where the terminal electrodes 8 are formed. The coil device 2 with the shielding layer 10 formed on the upper surface 4*a* (opposite-mounting-side surface) in this manner can have effectively reduced leakage flux from the opposite-mounting-side.

Second Embodiment

Figure 1B:
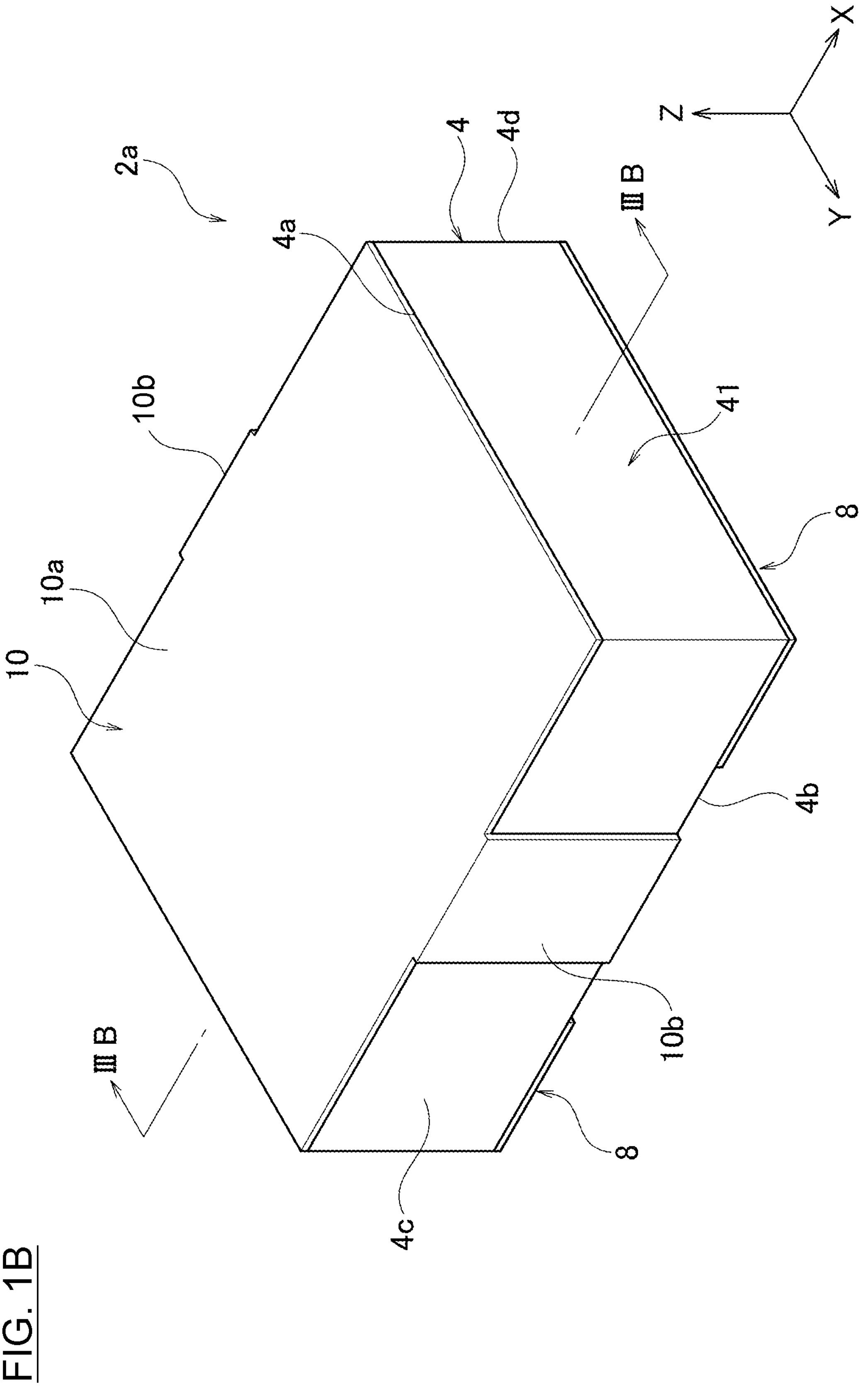
FIG. 1B is a perspective view of a coil device according to another embodiment of the present disclosure.
Figure 3B:
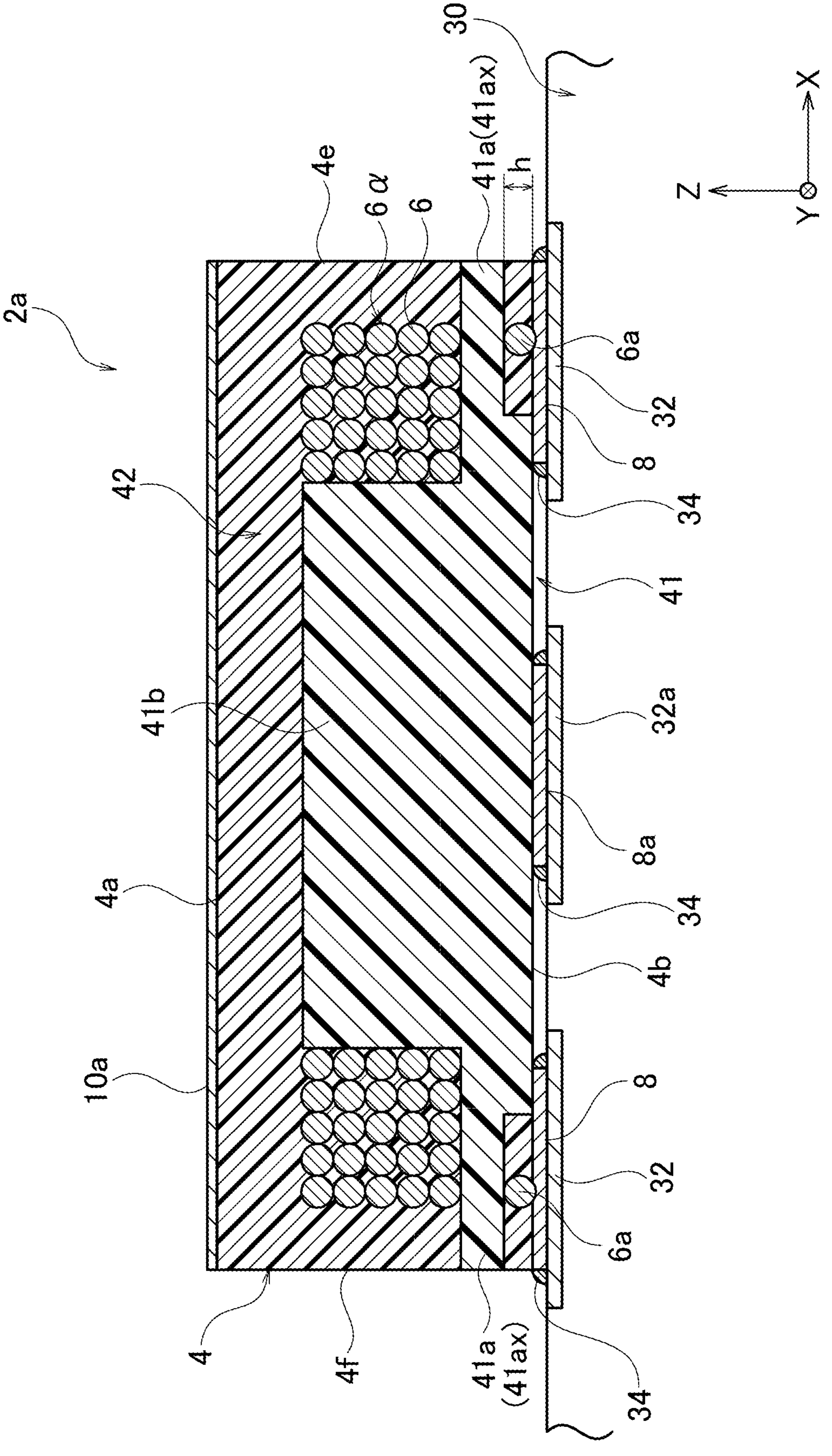
FIG. 3B is a cross-sectional view taken along line when the coil device shown in FIG. 1B is mounted on a circuit board.

As shown in FIGS. 1B and 3B, a coil device 2*a* of the present embodiment is similar to the coil device 2 of the first embodiment except for the following matters. Explanation of the similarities is omitted.

In the coil device 2*a* of the present embodiment, the shielding layer 10 includes the opposite-mounting-side shielding layer 10*a*, which is formed on the upper surface 4*a* of the element body 4, and ground conducting portions 10*b* extending from the opposite-mounting-side shielding layer 10*a* to the bottom surface 4*b* of the element body 4 across the side surfaces 4*c* and 4*d* of the element body 4 respectively. The ground conducting portions 10*b* are formed along the Z-axis direction at a substantially center in the X-axis direction of the side surfaces 4*c* and 4*d* of the element body 4. Along the X-axis direction, each ground conducting portion 10*b* has a width that does not cause a short circuit between the pair of terminal electrodes 8. Each ground conducting portion 10*b* is connected to a grounding terminal electrode 8*a* shown in FIG. 3B.

Via a joining member (e.g., the solder 34), the grounding terminal electrode 8*a* is connected to a grounding land 32*a* formed on the circuit board 30. The grounding terminal electrode 8*a* is formed similarly to the terminal electrodes 8. The ground conducting portions 10*b* are formed similarly to the opposite-mounting-side shielding layer 10*a*.

In the coil device 2*a* of the present embodiment, the shielding layer 10 can be connected to the grounding land 32*a* (ground) of the circuit board 30. Thus, the shielding layer 10 can have the same electric potential as the electric potential of the ground. Consequently, the effects of preventing leakage flux that are produced by the shielding layer 10 can be enhanced. The ground conducting portions 10*b* can also function as shields against leakage flux at the side surfaces 4*c* and 4*d* of the element body 4. Further, connecting the ground conducting portions 10*b* to the ground increases connecting locations of the coil device 2*a* other than the terminal electrodes 8, which supply electricity to the coil 6α, thus improving the mounting strength of the coil device 2*a* to the circuit board 30.

Third Embodiment

Figure 1C:
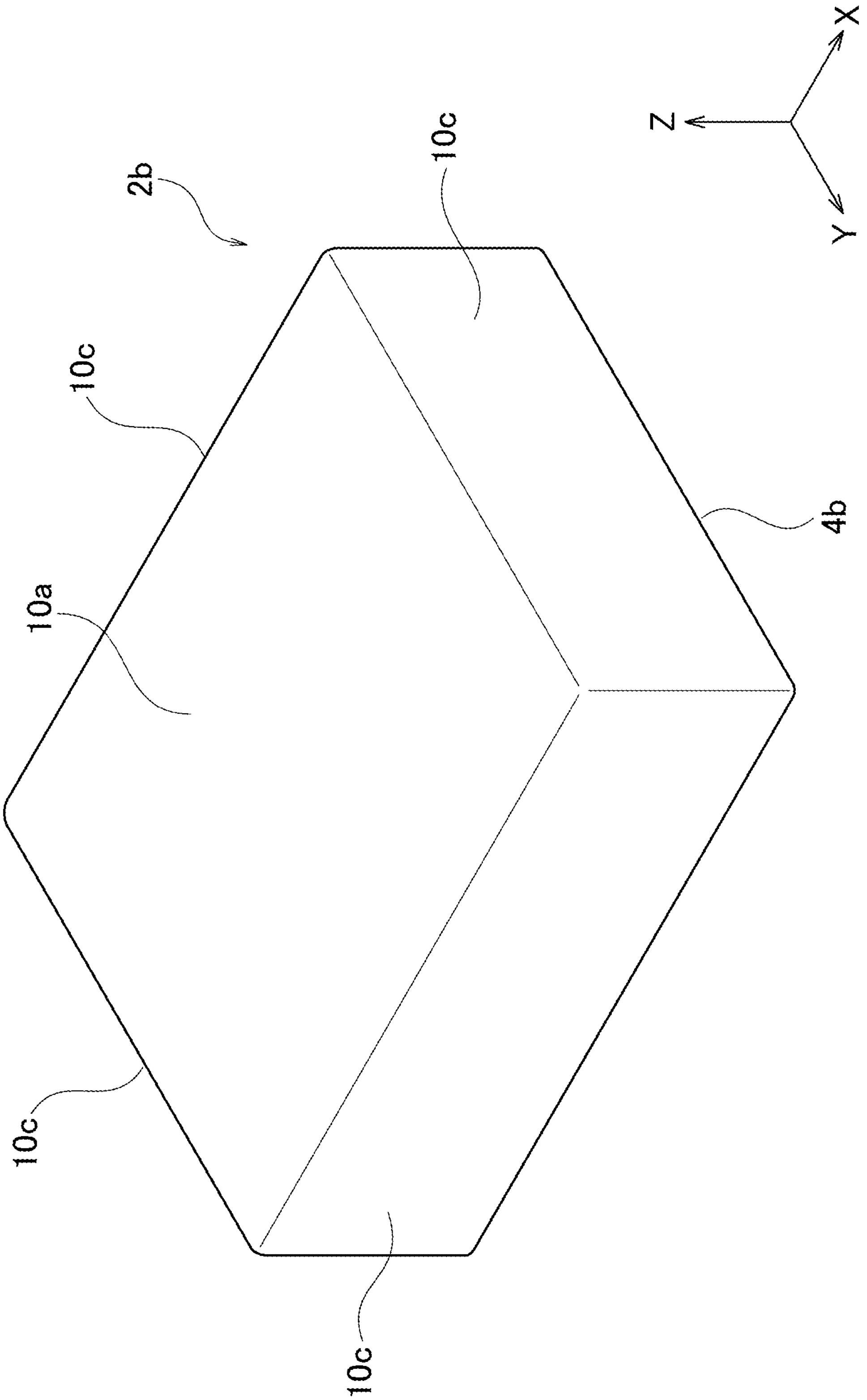
FIG. 1C is a perspective view of a coil device according to still another embodiment of the present disclosure.
Figure 2B:
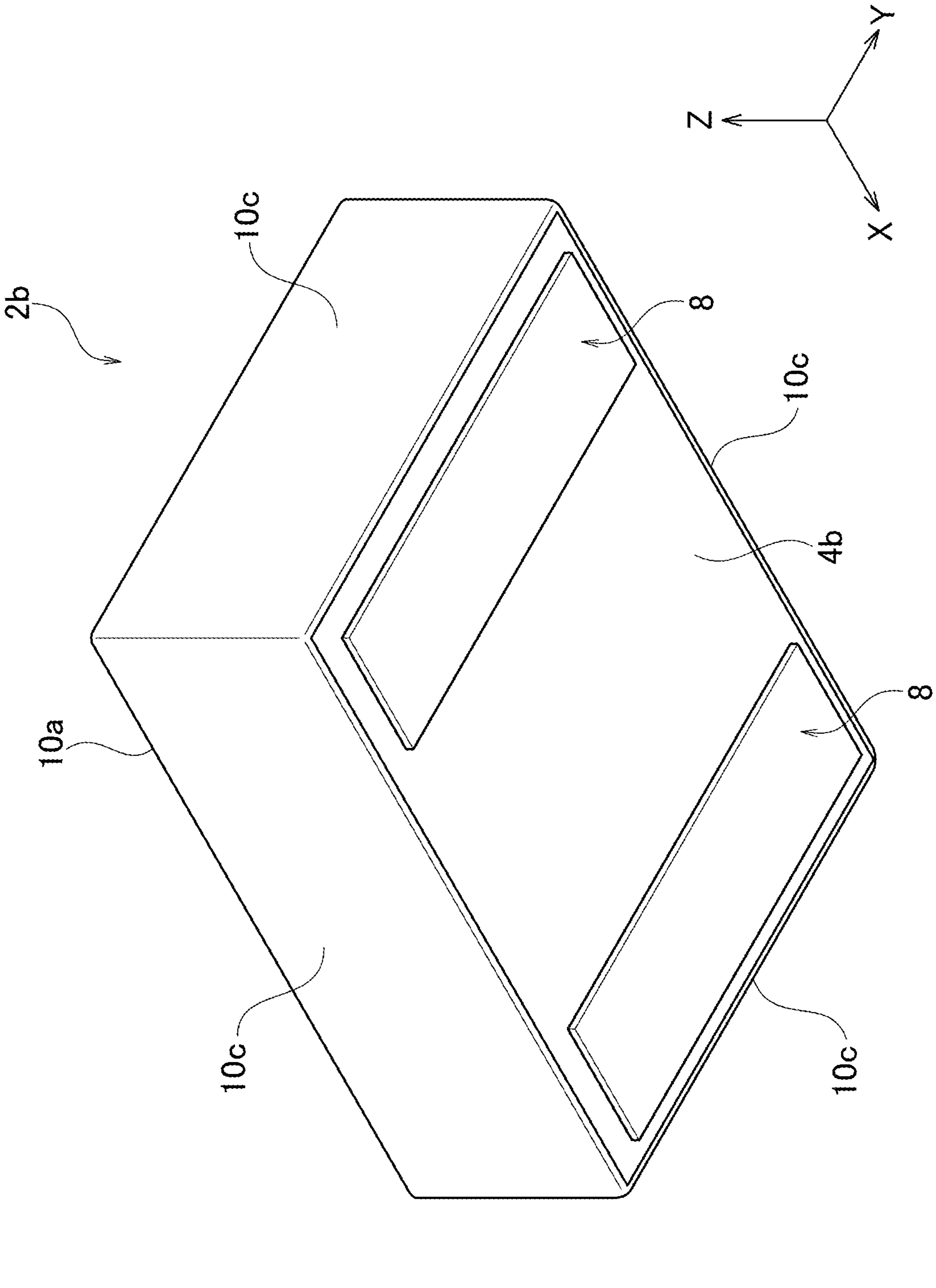
FIG. 2B is a perspective view of the coil device shown in FIG. 1C from a different angle.

As shown in FIGS. 1C and 2B, a coil device 2*b* of the present embodiment is similar to the coil device 2 or the coil device 2*a* of the above-mentioned embodiments except for the following matters. Explanation of the similarities is omitted.

In the coil device 2*b* of the present embodiment, the shielding layer 10 includes the opposite-mounting-side shielding layer 10*a*, which is formed on the upper surface 4*a* of the element body 4, and side shielding layers 10*c* each extending from the opposite-mounting-side shielding layer 10*a* to the bottom surface 4*b* or almost to the bottom surface 4*b* across the corresponding one of the four side surfaces of the element body 4.

The side shielding layers 10*c* are formed similarly to the opposite-mounting-side shielding layer 10*a* so as to continue from the opposite-mounting-side shielding layer 10*a*. The side shielding layers 10*c* are formed so that their respective bottom ends in the Z-axis direction are insulated from the terminal electrodes 8. Alternatively, each terminal electrode 8 is formed on the bottom surface 4*b* of the element body 4 so that the area of the terminal electrode 8 is within a range that enables the terminal electrode 8 to be insulated from the bottom ends of the side shielding layers 10*c* in the Z-axis direction.

As described above, the shielding layer 10 of the present embodiment may be formed so as to cover the outer surfaces of the element body except for the bottom surface 4*b* (the mounting-side surface of the element body). With this structure, leakage flux in a plane (including the X-axis and the Y-axis) direction can also be reduced.

Fourth Embodiment

Figure 1D:
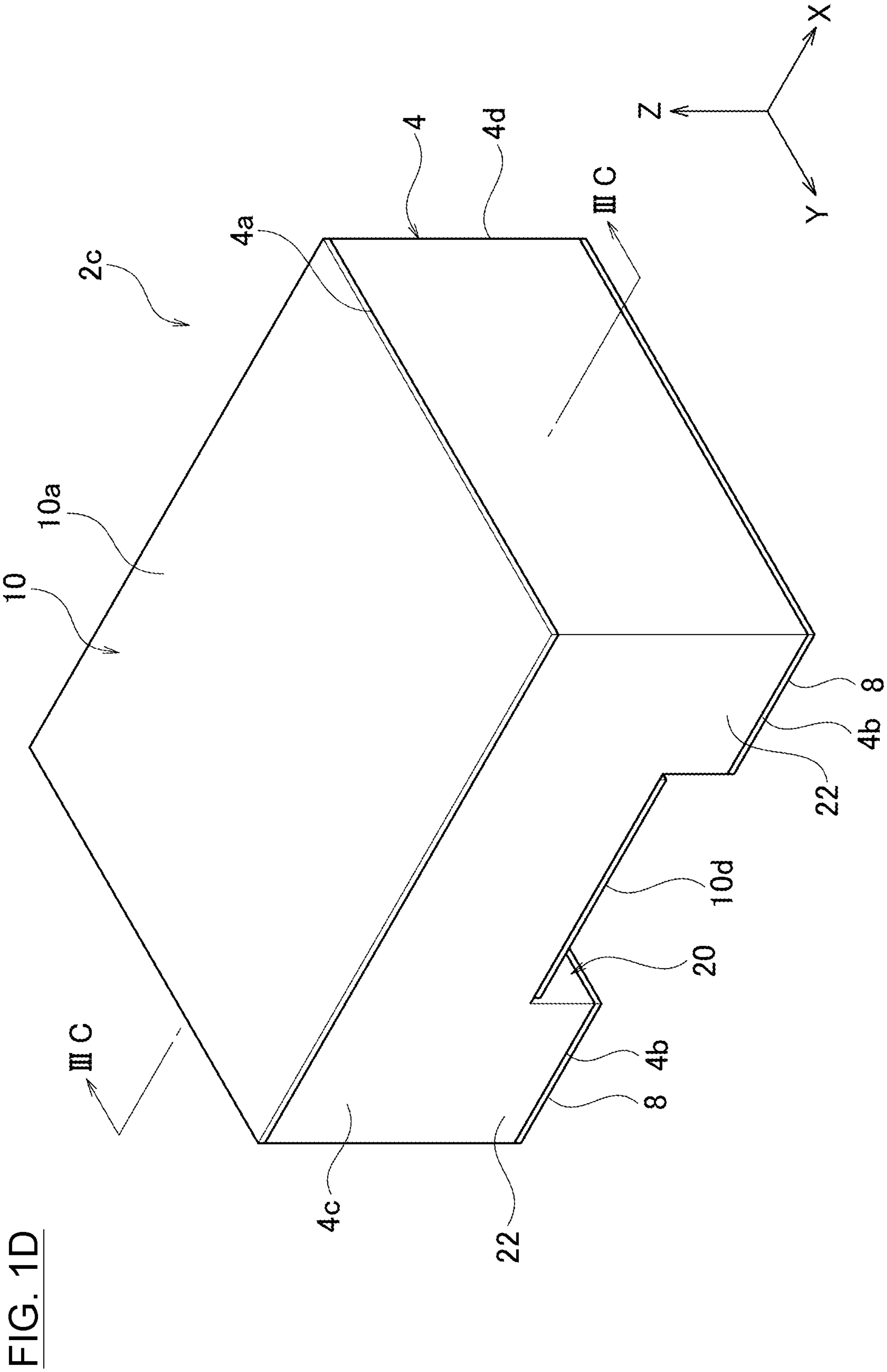
FIG. 1D is a perspective view of a coil device according to still another embodiment of the present disclosure.
Figure 3C:
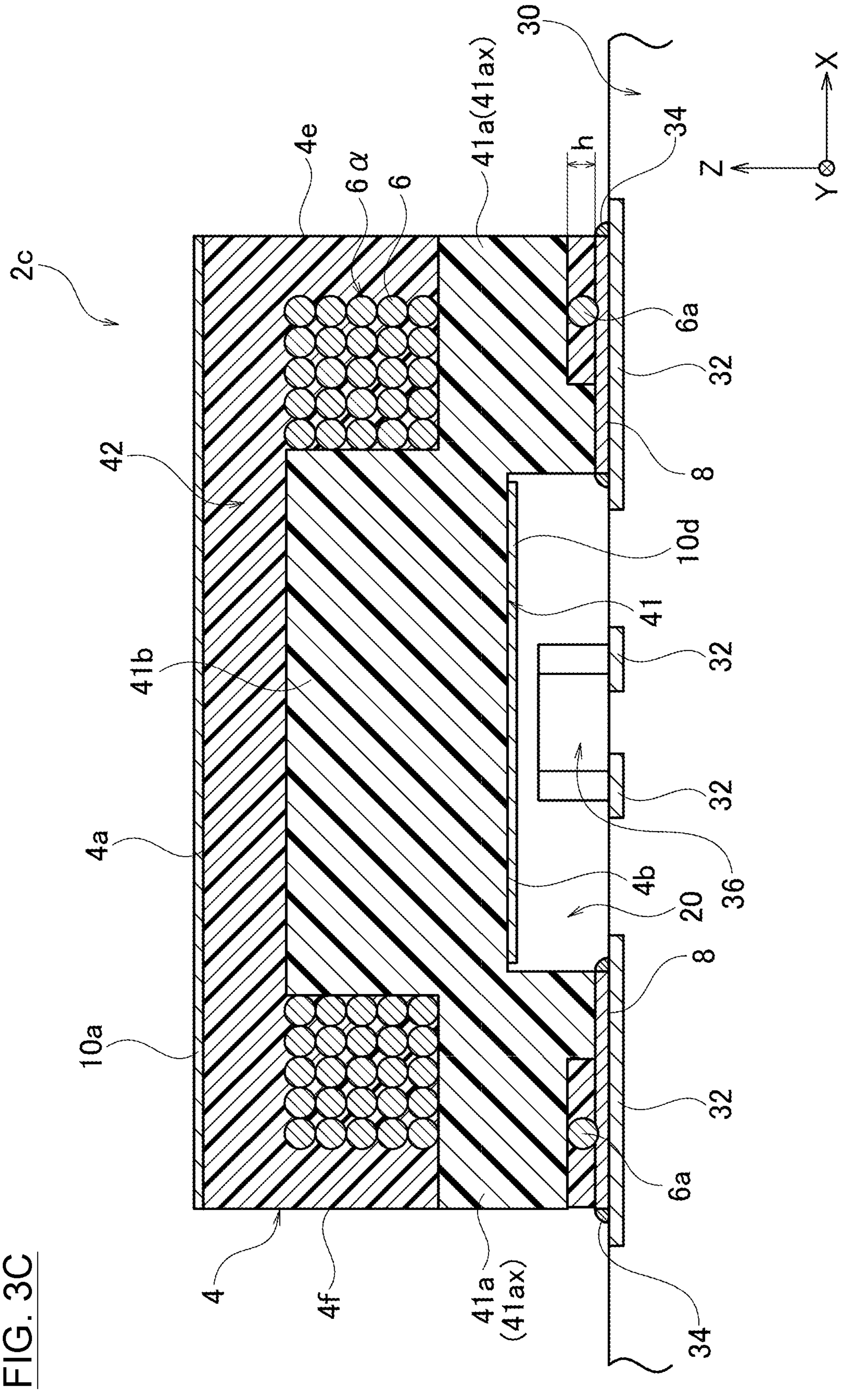
FIG. 3C is a cross-sectional view taken along line IIIC-IIIC when the coil device shown in FIG. 1D is mounted on a circuit board.

As shown in FIGS. 1D and 3C, a coil device 2*c* of the present embodiment is similar to the coil device 2 or the coil devices 2*a* to 2*b* of the above-mentioned embodiments except for the following matters. Explanation of the similarities is omitted.

In the coil device 2*c* of the present embodiment, a recess 20 that is recessed upwards in the Z-axis direction is formed between legs 22 disposed with a predetermined distance in between along the X-axis direction on the bottom surface 4*b* of the element body 4. Each terminal electrode 8 is formed on each leg 22 on the bottom surface 4*b* of the element body 4.

A mounting-side shielding layer 10*d* is formed on a ceiling surface of the recess 20 of the element body 4. The mounting-side shielding layer 10*d* is formed similarly to the opposite-mounting-side shielding layer 10*a*. The mounting-side shielding layer 10*d* may be separated from the opposite-mounting-side shielding layer 10*a* as shown in the figure, or may be formed continuously using partial side shielding layers (not shown) on the side surfaces 4*c* and 4*d* of the element body 4.

In the coil device 2*c* of the present embodiment, as shown in FIG. 3C, an electronic component 36 (e.g., a capacitor chip) can be disposed in the space formed by the recess 20 above the circuit board 30. The mounting-side shielding layer 10*d*, which is formed at the recess 20, can also reduce leakage flux, thus preventing negative influence on the electronic component 36.

Fifth Embodiment

Figure 1E:
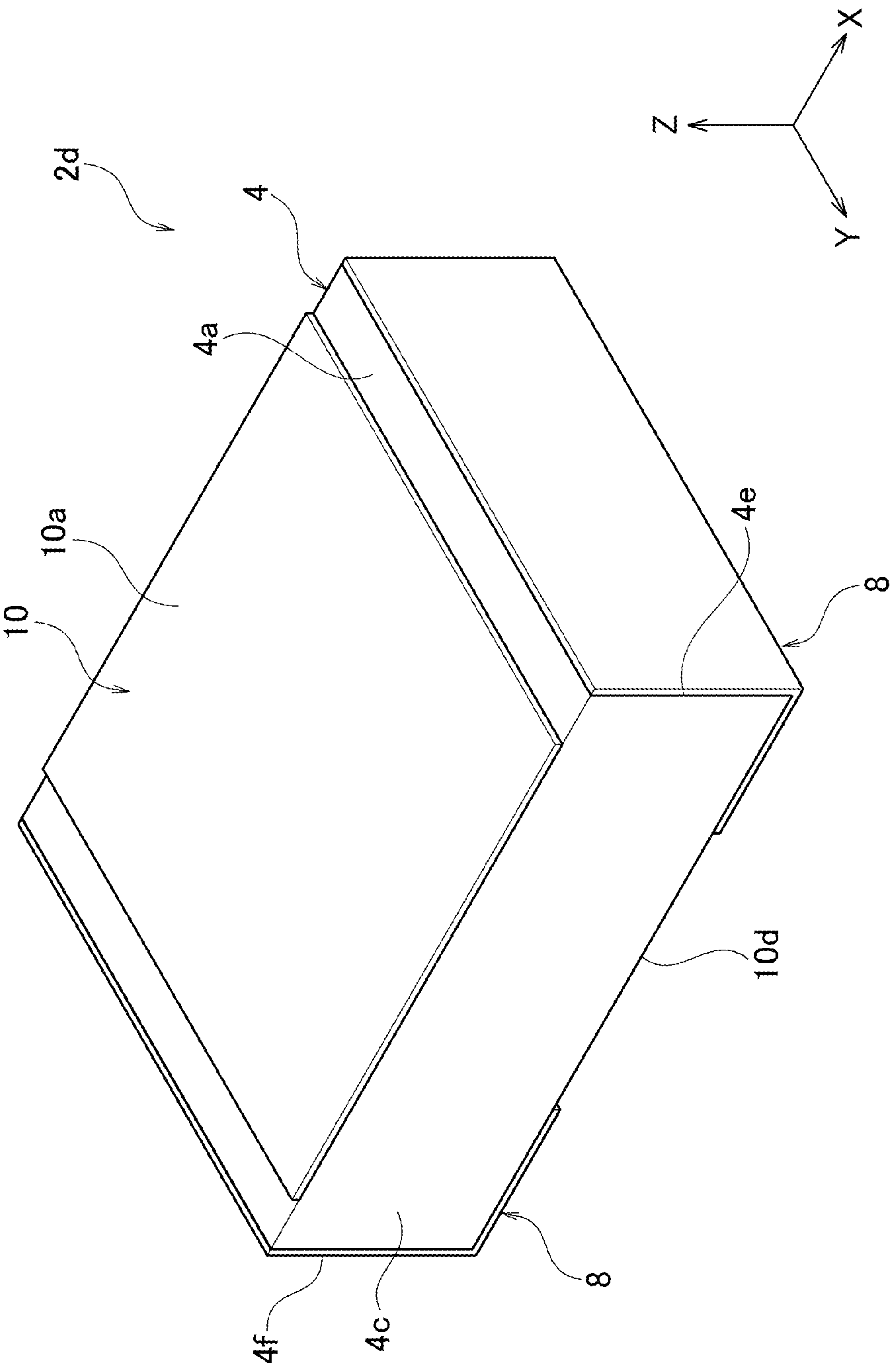
FIG. 1E is a perspective view of a coil device according to still another embodiment of the present disclosure.

As shown in FIG. 1E, a coil device 2*d* of the present embodiment is similar to the coil device 2 or the coil devices 2*a* to 2*c* of the above-mentioned embodiments except for the following matters. Explanation of the similarities is omitted.

In the coil device 2*d* of the present embodiment, the terminal electrodes 8 are formed in an L shape from the bottom surface 4*b* to the side surfaces 4*e* and 4*f* of the element body 4 respectively. The opposite-mounting-side shielding layer 10*a* of the shielding layer 10 is formed not entirely on the upper surface 4*a* of the element body 4 but on the upper surface 4*a* so as to be spaced apart from each terminal electrode 8 by a predetermined distance in the X-axis direction. This enables the opposite-mounting-side shielding layer 10*a* to be insulated from the terminal electrodes 8.

When the coil device 2*d* of the present embodiment is mounted on, for example, the circuit board 30 shown in FIG. 3A, a solder fillet or the like may readily be formed at the terminal electrodes 8 on the side surfaces 4*e* and 4*f* of the element body 4.

Other Embodiments

The present disclosure is not limited to the above-mentioned disclosure. The present invention can be modified variously within the scope of the present disclosure.

For example, although the coil 6α includes the round wire 6 in the above embodiments, the wire 6 is not limited to this kind and may be a flat wire whose conductor portion has a substantially rectangular cross-sectional shape. Alternatively, the wire 6 may be a square wire or a litz wire including multiple twisted strands. Furthermore, the coil 6α may include laminated conductive plates.

In the above-mentioned embodiments, the paste for forming the terminal electrodes 8 and the shielding layer 10 includes the metal raw material powder containing both the microparticles and the nanoparticles. However, the paste may include either one of the two, or the paste may include, instead of the microparticles, metal particles with a specific surface area larger than that of the microparticles.

Further, in the above-mentioned embodiments, the resin electrode layer of the terminal electrodes 8 and the coating layer constituting the shielding layer 10 are formed by heating the same paste. However, different pastes may be used. For example, the terminal electrodes 8 may include any electrode layer as long as it can electrically connect to the lead portions 6*a* of the wire 6.

It is preferable that, in the metal-rich layer 12, which is included in the shielding layer 10, the particles or lumps of the metal component are connected continuously so as to be layered as shown in FIG. 4B. The paste for forming the metal-rich layer 12 shown in FIG. 4B may include the following metal raw material powder at a predetermined ratio.

The preferred metal raw material powder includes the microparticles having a particle size of a micrometer order and the nanoparticles having a particle size of a nanometer order. The microparticles have an average particle size of preferably 1 to 10 μm and more preferably 3 to 5 μm. The nanoparticles have an average particle size of preferably less than 800 nm and more preferably 100 to 500 nm.

Further, both the microparticles and the nanoparticles may preferably include Ag as a main component. When the paste includes a metal element other than Ag, that metal element may be in any form. For example, the metal element other than Ag may be included as particles other than the microparticles and the nanoparticles, or may be solid dissolved into the microparticles.

In the above-mentioned embodiments, the shielding layer 10 is formed using an application method on the surface of the element body 4, which includes the resin and the magnetic material. However, the shielding layer 10 may be formed on a surface of an element body that includes a sintered body of a magnetic material and excludes resin.

For example, the first core 41 of the element body 4 may be a sintered body including a ferrite powder or a metal magnetic powder. Further, the element body 4 may be a dust core or a sintered core having an FT type, an ET type, an EI type, a UU type, an EE type, an EER type, a UI type, a drum type, a pot type, or a cup type shape, and a coil may be wound around the core to constitute an inductor element. In this case, it is not necessary to embed a lead portion inside the element body, and the lead portion may be drawn along the outer periphery of the core to connect to an outer surface of the terminal electrode 8.

The coil device according to the present disclosure is not limited to an inductor and may be other electronic devices, such as a transformer, a choke coil, and a common mode filter.

EXAMPLES

Hereinafter, the present disclosure is explained based on further detailed examples. However, the present disclosure is not limited to the examples.

Example 1

In Example 1, an inductor sample shown in FIG. 1A was prepared. Specifically, an element body 4 was manufactured using the method explained in the description of the embodiments, and a shielding layer 10 was formed on an upper surface 4*a* of the element body 4.

To form the shielding layer 10, a paste described in the description of the embodiments was used, and a heat treatment was performed under the conditions explained in the description of the embodiments.

Figure 5:
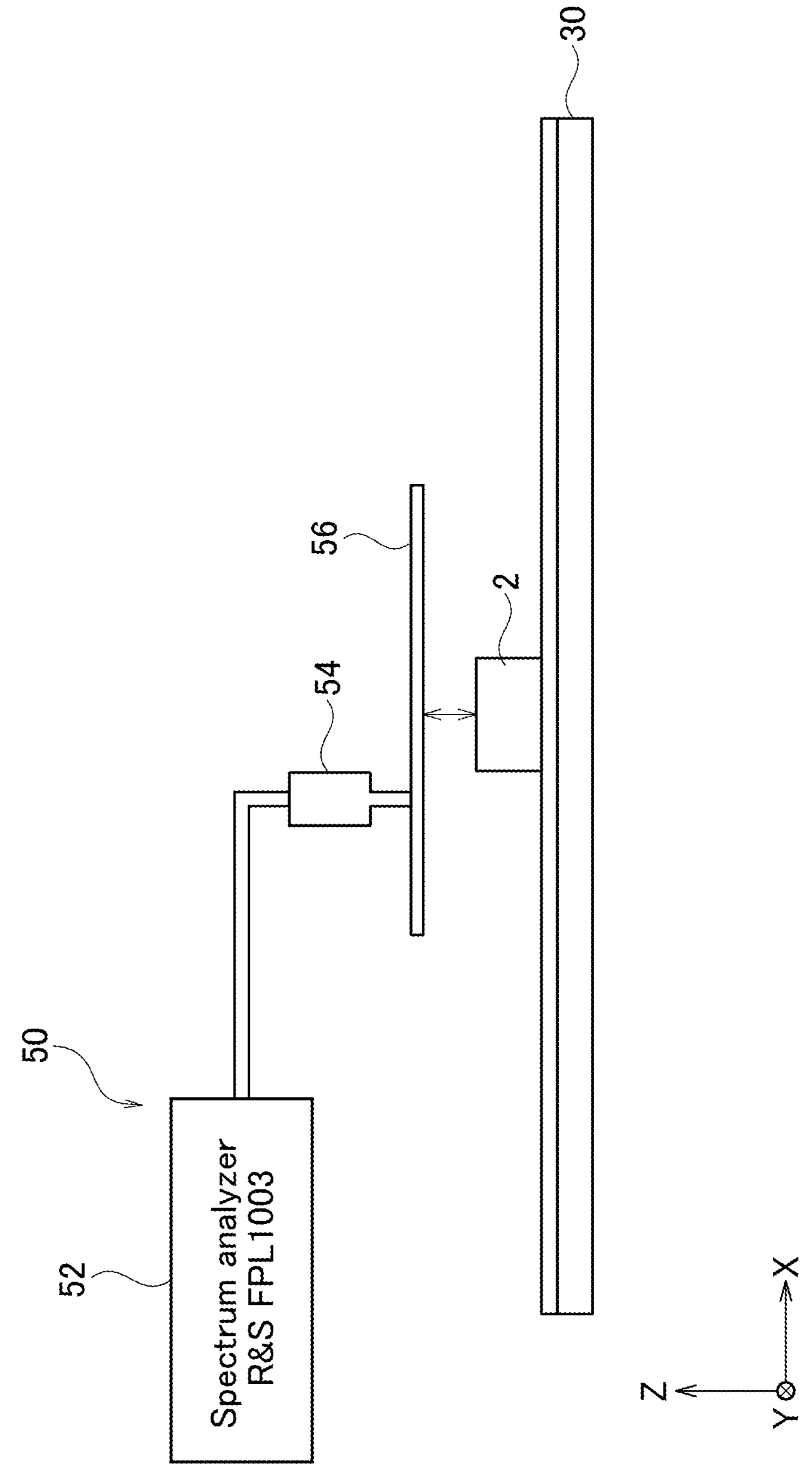
FIG. 5 is a schematic diagram of a system for measuring leakage flux.

The given inductor sample (a coil device 2) was connected to a circuit board 30 for testing as shown in FIG. 5, and the leakage flux of the sample coil device 2 was measured using an analysis unit 52 of a leakage flux measurement system 50.

Specifically, a measurement plane 56 parallel to the circuit board 30 was defined above the sample coil device 2 at a predetermined distance (e.g., 1 mm) from the sample coil device 2, and a probe 54 was moved along the measurement plane, to measure the leakage flux of the sample coil device 2. Testing of the leakage flux of the coil device 2 was performed at 400 kHz (condition 1) and at 2 MHz (condition 2). The leakage flux of the coil device 2 in the perpendicular (Z-axis) direction and the leakage flux thereof in the horizontal (X-Y axis) direction were measured. Table 1 shows the results.

TABLE 1

| | Proportion of metal in metal-rich area | Condition 1 (400 kHz) Perpendicular direction | Condition 1 (400 kHz) Horizontal direction | Condition 2 (2 MHz) Perpendicular direction | Condition 2 (2 MHz) Horizontal direction |
|---|---|---|---|---|---|
| Comparative Example 1 | No shielding layer | 46.7[dBuV] | 88.1[dBuV] | 57.6[dBuV] | 96.7[dBuV] |
| Example 1 | 50% to 70% | 46.4[dBuV] | 87.9[dBuV] | 57.2[dBuV] | 96.1[dBuV] |
| Example 2 | 80% or more | 45.8[dBuV] | 87.6[dBuV] | 51.2[dBuV] | 92.2[dBuV] |

FIG. 4A is a schematic diagram of a photograph taken by SEM of a cross section including the shielding layer 10 of the coil device given in Example 1. A metal-rich layer 12 had an average thickness of 15 μm, and a resin-rich layer 14 had an average thickness of 2 μm. An intermediate layer 16 including a nickel plating, and an outermost layer 18 including a tin plating were also observed. Table 1 shows the proportion of metal in the metal-rich layer 12 measured using the cross-sectional photograph.

Example 2

In Example 2, an inductor sample (coil device 2) was prepared as in Example 1 to perform measurement as in Example 1, except that the following matters were different. Table 1 shows the results. FIG. 4B is a schematic diagram of a cross-sectional photograph including the shielding layer 10.

In Example 2, a paste including a metal powder having an average particle size smaller than that in Example 1 was used to form the shielding layer 10, and the heat treatment was performed under the conditions explained in the description of the embodiments.

Comparative Example 1

In Comparative Example 1, an inductor sample (coil device 2) was prepared as in Example 1 to perform measurement as in Example 1, except that the shielding layer 10 was not formed. Table 1 shows the results.

Evaluation

As shown in Table 1, it was confirmed that, in Example 1 and especially in Example 2, the shielding layer could effectively reduce leakage flux particularly at a high frequency even if the shielding layer was relatively thin, compared to Comparative Example 1. In Examples 1 and 2, it was also confirmed that the coil device could be reduced in size and in manufacturing costs, because the shielding layer 10 and terminal electrodes could be formed simultaneously.

Further, in a peeling test, it was confirmed that the shielding layer 10 had excellent adhesion to the surface of the element body 4, similarly to the terminal electrodes 8. It was thus confirmed that the black portion at the interface between the surface of the element body 4 and the metal-rich layer 12 shown in FIGS. 4A and 4B was not a void and was the resin-rich layer 14 filled with resin.

DESCRIPTION OF THE REFERENCE NUMERALS

2, 2*a*, 2*b*, 2*c* . . . inductor
4 . . . element body
4*a* . . . upper surface (opposite-mounting-side surface)
4*b* . . . bottom surface (mounting-side surface)
4*c* to 4*f* . . . side surface
41 . . . first core
41*a* . . . flange portion
41*b* . . . winding core
41*c* . . . notched portion
42 . . . second core
6α . . . coil
6 . . . wire
6*a* . . . lead portion
61 . . . leadout electrode portion
8 . . . terminal electrode
8*a* . . . grounding terminal electrode
10 . . . shielding layer
10*a* . . . opposite-mounting-side shielding layer
10*b* . . . ground conducting portion
10*c* . . . side shielding layer
10*d* . . . mounting-side shielding layer
12 . . . metal-rich layer (area)
14 . . . resin-rich layer (area)
15 . . . plating layer
16 . . . intermediate layer
18 . . . outermost layer
20 . . . recess
22 . . . leg
30 . . . circuit board
32 . . . land
32*a* . . . grounding land
34 . . . solder
36 . . . electronic component
50 . . . leakage flux measurement system
52 . . . analysis unit
54 . . . probe
56 . . . measurement plane

What is claimed is:

1. A coil device comprising:
an element body including a magnetic body;
a coil incorporated in the element body; and
a terminal electrode connected to a lead portion of the coil; wherein
a shielding layer including a metal and a resin is formed on at least one outer surface of the element body,
the shielding layer comprises a metal-rich area where the metal is observed to a greater extent than the resin and a resin-rich area where the resin is observed to a greater extent than the metal, and
the resin-rich area is disposed at an interface between the element body and the metal-rich area.

2. The coil device according to claim 1, wherein the metal occupies 50% or more of a cross section of the metal-rich area.

3. The coil device according to claim 2, wherein the metal occupies 80% or more of the cross section of the metal-rich area.

4. The coil device according to claim 1, wherein
the shielding layer comprises Ag.

5. The coil device according to claim 1, wherein the shielding layer comprises a coating layer made of a paste applied to the at least one outer surface of the element body; and the paste includes the metal and the resin.

6. The coil device according to claim 5, wherein the coating layer is formed by heating the applied paste at a temperature ranging from 170° C. to 230° C.

7. The coil device according to claim 5, wherein the paste comprises a substantially spherical metal powder.

8. The coil device according to claim 5, wherein the paste comprises a flat-shaped metal powder.

9. The coil device according to claim 1, wherein the shielding layer is formed on the at least one outer surface opposite an outer surface of the element body where the terminal electrode is formed.

10. The coil device according to claim 1, wherein the shielding layer comprises an opposite-mounting-side shielding layer formed on an opposite-mounting-side surface of the element body, and a ground conducting portion extending from the opposite-mounting-side shielding layer almost to a mounting-side surface of the element body across a side surface of the element body.

11. The coil device according to claim 1, wherein a recess recessed toward an opposite-mounting-side of the element body is formed on a mounting-side surface of the element body; and a mounting-side shielding layer is formed at the recess.

12. The coil device according to claim 1, wherein the shielding layer extends to cover outer surfaces other than a mounting-side surface of the element body.

13. The coil device according to claim 1, wherein the terminal electrode extends in an L shape from a mounting-side surface of the element body to a side surface of the element body.

14. A coil device comprising:
an element body including a magnetic body;
a coil incorporated in the element body; and
a terminal electrode connected to a lead portion of the coil; wherein
a shielding layer including a metal and a resin is formed on at least one outer surface of the element body,
the shielding layer comprises a metal-rich area where the metal is observed to a greater extent than the resin, and
the terminal electrode comprises an area including a material identical to that of the metal-rich area of the shielding layer.

15. The coil device according to claim 14, wherein the shielding layer comprises a resin-rich area where the resin is observed to a greater extent than the metal; and the resin-rich area is disposed at an interface between the element body and the metal-rich area.

16. A coil device comprising:
an element body including a magnetic body;
a coil incorporated in the element body; and
a terminal electrode connected to a lead portion of the coil; wherein
a shielding layer including a metal and a resin is formed on at least one outer surface of the element body, and
a plating layer is formed on a surface of the shielding layer.

17. The coil device according to claim 16, wherein the shielding layer comprises a metal-rich area where the metal is observed to a greater extent than the resin.

* * * * *